No. 681,682. Patented Sept. 3, 1901.
D. CONNERTH & J. ROTHWEILER.
SAFETY BLIND FOR HORSES.
(Application filed Sept. 14, 1899.)
(No Model.)
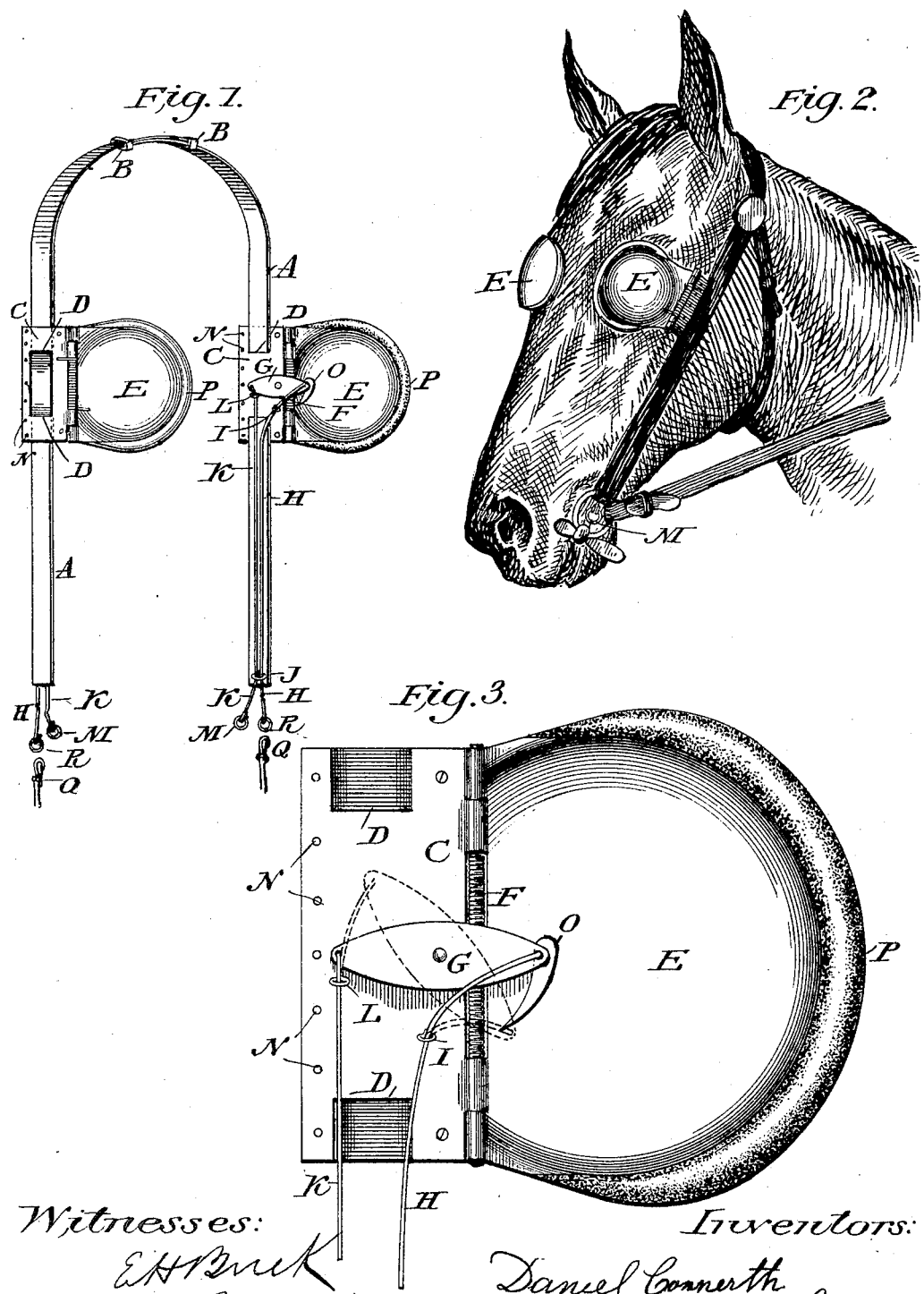

UNITED STATES PATENT OFFICE.

DANIEL CONNERTH, OF CHUNCHULA, ALABAMA, AND JOSEF ROTHWEILER, OF CHICAGO, ILLINOIS.

SAFETY-BLIND FOR HORSES.

SPECIFICATION forming part of Letters Patent No. 681,682, dated September 3, 1901.

Application filed September 14, 1899. Serial No. 730,502. (No model.)

*To all whom it may concern:*

Be it known that we, DANIEL CONNERTH, a subject of the Emperor of Austria-Hungary, residing at Chunchula, in the county of Mobile and State of Alabama, and JOSEF ROTHWEILER, a citizen of the United States, residing at Chicago, in the county of Cook and State of Illinois, have invented a new and useful Improvement in Blinkers or Blinds (Safety-Blinds) for Shy or Skittish Horses, of which the following is a specification.

This invention relates to improvements in safety-blinds for horses; and the main object of the invention is the provision of an adjustable blind and a simple mechanism for allowing the blinds to entirely incase the horses' eyes or hold them away from the eyes, as circumstances may require.

Another object of our invention is the provision of safety-blinds for horses which are very simple, durable, and inexpensive in construction and practical in use.

To attain the desired objects, the invention consists of safety-blinds for horses embodying novel features of construction and combination of parts, substantially as disclosed herein.

In the drawings, Figure 1 is a perspective view of the entire blind-holding device and operating mechanism. Fig. 2 shows the device attached to the bridle on a horse's head with blinds closed; and Fig. 3 is a detail view of one of the blinds, taken from the inside.

Referring to the drawings, A designates the metal bow, which is made in two parts and is held together by means of the clamps B, which allow the bow to be adjusted to any size. Slidably mounted upon long depending members of the bow are the two hinge-plates C, provided with the slots D, through which the bow is inserted, allowing the plates to be adjustable according to the location of the eyes of the horse.

The blinkers or blinds E are concaved, so as not to come in contact with the animal's eyes when closed, being bound on their edges with felt P or other soft material. These blinds are attached to the plates by spring-hinges F, which have a tension toward the eyes of animals, being held out of contact by means of the button or latch G, which is elliptical in shape and is pivoted to the hinge-plates upon their inner sides. Cords H are attached to the forward ends of these buttons and pass through the guiding-eyelets I of the plates and the eyelets J upon the inside near the lower ends of the bow's members. The rings R, carried upon the free ends of the cords H by being connected to the long straps by means of snap-hooks Q, are readily accessible to the driver when it is desired to close the blinds over the animal's eyes, as the straps carrying the hooks Q are in reach of the driver. Adapted to contact the forward ends of the buttons are the claw-shaped plates O, which are secured to the inner sides of the blinds to hold them open more perfectly and which allow them to be closed gradually instead of with a snap to avoid frightening the animal. To the rear end of the buttons G are secured other cords K, which pass through eyelets L and the eyelets J, these cords being provided with rings M, which are connected to said cords by means of an elastic piece, so that the rings are normally held close against the eyelet J or near the ring of a bit, as shown in Fig. 2. In order that the hinge-plates may be secured to the bridle upon the inner sides thereof, we provide the openings N.

From this description the operation of our improved safety-blinds for horses is readily understood and its numerous advantages fully appreciated, but briefly stated it is as follows: The blinds are first set open by pulling upon the rings M, which pull the inner ends of the buttons downward and cause the outer ends of the buttons to contact the plates O, connected to the blinds, which have been held open by the hands until engaged by said plates. To close the blinds, it is simply necessary to pull upon the cords H, which pull the outer ends of the buttons downward, thus allowing the springs to close the blinds, so that they completely blind or incase the eyes of the horse.

It is evident that we provide a very simple, durable, and inexpensive device for the purpose of quieting spirited animals and one which can be operated and set for operation in a short time, thus producing a practical and useful device.

We claim—

In combination with a bridle, hinge-plates, one of which is secured to each of the side straps of the bridle, blinders, one of which is hinged to each of the hinge-plates, a spring interposed between each blinder and its cooperating hinge-plate and acting to hold the blinders inwardly of the bridle, a button or latch for each blinder pivoted to either the hinge-plate or the blinder and operating to hold the blinders open, and an operating-cord connected to the latch for releasing the spring.

DANIEL CONNERTH.
JOSEF ROTHWEILER.

Witnesses as to Daniel Connerth:
EDWARD R. HAYSSEN,
CHAS. W. HAYSSEN.

Witnesses as to Josef Rothweiler:
GUSTAV ROTHWEILER,
JACOB MÜLLER.